United States Patent Office 3,129,198
Patented Apr. 14, 1964

3,129,198
QUATERNARY MONOIMIDAZOLINE SALTS AS THERMOSETTING CATALYSTS FOR RESINOUS BLENDS COMPRISING POLYEPOXIDE POLYMERS AND ACRYLIC POLYMERS HAVING A PLURALITY OF CARBOXYL GROUPS THEREIN
Vernon G. Nix, Park Forest, Ill., assignor to The Sherwin-Williams Company, Cleveland, Ohio, a corporation of Ohio
No Drawing. Filed Feb. 8, 1960, Ser. No. 7,131
2 Claims. (Cl. 260—45.5)

This invention relates to a combination of fluid components having latent cross-linking or thermosetting quality when acted upon by catalytic influence under heating conditions. The fluid admixture is an improvement over closely related prior art compositions in that it will remain fluid at room temperatures of the order of 20 to 30° C. for extended periods of time. The most closely related prior art compositions were and are severely limited in their usefulness. Utility limitations are due to their brief fluid life or rapid sol-to-gel transformation.

More particularly, this invention is directed to a novel composition or matter comprising in intimate fluid condition a polyepoxide, an interpolymer containing an acrylic acid and at least one other vinyl monomer interpolymerized together and as a latent cross-linking catalyst, an aliphatic substituted quaternary imidazolinium salt said composition characterized by its fluid condition at room temperature and its quality of thermosetting or cross-linking at elevated temperatures to form hard, durable solid films of value as protective coatings and particularly so over metal substrates.

One skilled in the protective coatings art and aware of the prior art recognizes the general lack of novelty in either one of the two film-forming compositions used in non-catalytic quantity. Mixtures and blends of similar compositions are also old in the protective coatings art. A further factual premise is that quaternary amines have also heretofore been useful as catalysts in similar compositions as promoters of cross-linking of baking films.

However, all of the compositions as heretofore suggested in the art have limited usefulness because of relative short "pot life" when the components are in intimate admixture. When the fluid compositions of the prior art are in intimate contact for periods of the order of hours to several days, gelation occurs, or the admixture advances in polymer size to such amount as to become a solid. As a solid in massive form the product has no commercial utility for protective coatings end use. Because of the brief pot life, similar ready mixed coatings as suggested in the art cannot be manufactured, stored, shipped and used in the regular course of business.

Illustratively, the prior art has suggested use of the quaternary ammonium salt benzyl trimethyl ammonium chloride as useful in blends similar to those hereinafter more fully described.

In an admixture of polyepoxide and acrylic acid-acrylate interpolymer with catalytic quantities of the said quaternary as suggested in the art, the admixture lost utility in less than one week under test storage conditions. A comparable admixture, but with the substitution of a quaternary monoimidazolinium catalyst as hereinafter more completely illustrated and described, gelation did not occur under test storage conditions maintained over test periods of several months duration.

Thus, it is the object of this invention to provide useful fluid coating compositions which are of essentially linear nature and which will remain so at room temperature for practical time intervals, but which will, under baking conditions and exposed in relatively thin films, co-react to become thermo-set. The thermo-set condition is brought about by cross-linking of the two diverse and essential components generally identified in the foregoing introduction under the influence of the catalytic agent.

This invention, then, is directed to a thermosettable fluid coating composition which comprises in intimate combination three essential components, namely; a polyepoxide having an epoxide equivalent value within the range of 100 to less than 1000; an acrylic interpolymer of two monomers minimally, at least in excess of 4% but not more than 25% by weight of the acrylic interpolymer originating as an acrylic acid monomer and the other monomers therein of the general structure

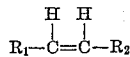

where $R_1$ is hydrogen or a lower alkyl group containing less than 3 carbon atoms; where $R_2$ is an aryl or alkyl group containing less than 10 carbon atoms; when $R_2$ is aryl, $R_1$ is a hydrogen group. When $R_2$ is aryl, it is preferably a single aromatic ring and if $R_2$ is an alkyl group it is preferably a

group and where R is a hydrocarbon residue from methyl to octyl group.

Each of the essential components to the combination is hereinafter more specifically referred to in detail.

SINGLE CARBOXY GROUP CONTAINING ARCYLIC INTERPOLYMERS

The prior art has extensively dwelt with a class of single carboxy group containing acrylic monomers which are interpolymerized with one or more additional unsaturated monomers wherein at least one of the monomers is an acrylic acid as described and is the source of the carboxyl groups in the resultant interpolymer. The other monomers interpolymerized therewith fall within the structure

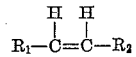

the single $>C=C<$ group being the sole reactive center of polymerization. Such monomers are generically labeled vinyl compounds where $R_1$ is a hydrogen because of their vinyl unsaturation, or substituted in whole or in part for the vinyl monomer may be one or more lower alkyl esters of one of the acrylic acids also in monomeric form having the general structure

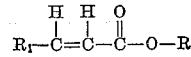

Among the useful acids are methacrylic acid, acrylic acid, ethacrylic acid, phenylacrylic acid, crotonic acid, etc. No novelty attaches to the single carboxyl group containing acrylic acid monomer interpolymers with monomeric vinyl compound and/or lower alkyl esters of such acids from the methyl to the 2-ethyl hexyl ester. Interpolymers containing reactive carboxyl groups are a heritage of the art, and while no means complete, the following patents are included herein by reference for what they teach relative to the single carboxyl group containing acrylic acid monomers interpolymerized with compounds containing a single

group. Reference is hereby made to Hagedorn, U.S. 1,981,102; Starck U.S. 2,263,598; Mack U.S. 2,399,684; Minter U.S. 2,530,983; Caldwell U.S. 2,541,011; Carlson U.S. 2,726,230; Brown U.S. 2,754,280; Simon U.S. 2,763,578; Gray U.S. 2,763,633; Sanders U.S. 2,787,561; Scott et al. U.S. 2,806,020; Segall et al. U.S. 2,798,861, etc. The preceding group of prior art patents while incomplete does establish the flavor of the prior art relating to interpolymers useful in the combinations essential to the ends of the invention.

To review and summarize, the vinyl interpolymers containing acrylic acid residues component of this invention are made in well known ways by processing together two or more vinyl compounds in a mutual solvent in the presence of free radical catalysts. The method of interpolymerization is fully described in the prior art. Methods of producing interpolymers of the class here of interest are not a part of this invention and numerous species of vinyl interpolymers of the class useful have been heretofore described in the art referred to directly and included by indirection.

Among such vinyl interpolymers having free or unreacted carboxyl groups made in accordance in general with the foregoing are interpolymers formed from the following mixtures of monomeric materials which are illustrative but not exhaustive of the class useful in the present inventive combination.

(A)
| | Parts |
|---|---|
| Styrene | 62 |
| Ethyl acrylate | 30 |
| Methacrylic acid | 8 |

(B)
| | |
|---|---|
| Ethyl acrylate | 105 |
| Methyl methacrylate | 45 |
| Glacial methacrylic acid | 12 |

(C)
| | |
|---|---|
| Styrene | 50 |
| 2-ethyl hexyl acrylate | 35 |
| Acrylonitrile | 6 |
| Methacrylic acid | 7 |

(D)
| | |
|---|---|
| Vinyl acetate | 75 |
| Vinyl stearate | 5 |
| Ethyl acrylate | 10 |
| Crotonic acid | 10 |

(E)
| | |
|---|---|
| Styrene | 72 |
| Acrylic acid | 8 |
| Methyl acrylate | 20 |

(F)
| | |
|---|---|
| Styrene | 72 |
| Methyl methacrylate | 20 |
| Acrylic acid | 8 |

(G)
| | |
|---|---|
| α Methyl styrene | 72 |
| Methyl methacrylate | 20 |
| Methacrylic acid | 8 |

(H)
| | |
|---|---|
| Methyl acrylate | 85 |
| Acrylic acid | 8 |
| 2-ethyl hexyl acrylate | 7 |

(I)
| | |
|---|---|
| Styrene | 87 |
| Acrylonitrile | 20 |
| Acrylic acid | 20 |

(J)
| | |
|---|---|
| Ethyl acrylate | 60 |
| Methyl methacrylate | 40 |
| Methacrylic acid | 12 |

(K)
| | |
|---|---|
| Methyl methacrylate | 65 |
| Methacrylic acid | 20 |
| 2-ethyl hexyl acrylate | 15 |

(L)
| | |
|---|---|
| Styrene | 114 |
| Ethyl acrylate | 34 |
| Methacrylic acid | 14 |

From a consideration of the foregoing acrylic acid containing interpolymers, it will be observed that each interpolymer is characterized by at least one first monomeric reactant having a single

group as the sole reactive center of polymerization and a minor amount, less than about 25% but not less than 4% of the total polymeric compound of a second monomeric reactant having both a single

group and a single

group, the ethylenic group as in the first instance being the sole reactive center of polymerization of the second monomeric reactant. The acidic monomeric reactant, as previously indicated, is most often acrylic or methacrylic acid, however crotonic acid illustrates another useful acidic acrylic monomer. The lower alkyl esters of said acids having not more than about 10 carbon atoms in the alkyl group are of primary interest as the first reactive monomer while styrene and its homologues may be substituted in whole or in part therefor.

Thus, the identifying phrase, single carboxyl group containing acrylic acid monomer interpolymers with at least one other

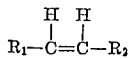

monomer of the general structure

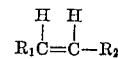

is intended to include the prior art heretofore described (the $R_1$ and $R_2$ groups are as herein indicated) and included by reference.

An essential limitation, for purposes of this invention, is that the foregoing acrylic interpolymers contain at least 4% but not in excess of about 25% by weight of the interpolymer of the single carboxyl group containing acrylic acid monomer.

The properties of the baked films of the combinations of polyepoxide, single carboxyl containing acrylic interpolymer and the specific imidazoline catalyst containing coatings may be varied within rather wide limits, as may be anticipated from the state of the art as developed in relation to use of what might be labeled "short-term" catalysts directed to other than the quaternary imidazoline salts of this invention. The films may be formulated ranging from very flexible, moderately hard, moderately chemically resistant to very hard, very chemically resistant, very durable films. All of the formulations are observed to be of excellent adhesive quality over a variety of substrates.

The single carboxyl group containing acrylic interpolymer of the inventive combination has been specifically explored through a range from 20 to 90 parts of alpha alkyl substituted acrylate, 5–80 parts lower alkyl acrylate and from 4 to 25 parts of the single carboxyl group containing acrylic interpolymer. Increased methyl methacrylate content leads to film hardness increase. Film flexibility is enhanced with 2-ethyl hexyl acrylate as compared, for example, with ethyl or methyl acrylate. Economically, ethyl acrylate has advantages. As the acid content of the monomer blends used in the interpolymer is increased, difficulties in reaction completion are increased. At 20% methacrylic acid content, for example, 2-ethyl hexyl acrylate was found to be essential to high interpolymer yields. Thus, to make the essential single carboxyl group containing acrylic acid monomer interpolymers with a second monomer containing a single

group (devoid of other reactive centers), the higher the acidic monomer content above the median range within the range described, more care must be given to monomer selections. There are three essentials to the above intended acrylic interpolymer: (1) That interpolymerization is effected between the monomers solely through the

groups, (2) That one of the

group containing monomers contains a single carboxyl group and (3) That the latter monomer constitute from at least 4% to not greater than about 25% of the total acidic interpolymer.

THE POLYEPOXIDE COMPONENT

Essential as a reactant with the single carboxyl group unit containing acidic acrylic acid interpolymer under the influence of the monoimidazolinium salts and the baking schedule are one of the polyepoxides of the prior art which are more completely described in U.S. patents relating thereto including in particular U.S. 2,872,427. The latter patent is included herein as though its subject matter was set out in toto, by reference.

Among the polyepoxides and of first order of interest in the present invention are the polyglycidyl ethers which are the complex polymeric reaction products of polyhydric phenols with polyfunctional halohydrins, illustratively and popularly, epichlorohydrin. One series of these polyepoxides of considerable commercial significance and of paramount value to this invention are produced by condensation of epichlorohydrin and 2,2-bis(p-hydroxy phenyl) propane.

Of a second order of interest are the polymeric reaction products of aromatic polyamines with chlorohydrins, generally formed by reacting an aromatic polyamine with an excess of stoichiometric amounts of epichlorohydrin in the presence of alkali to dehydrochlorinate to form a polymeric glycidyl amine.

Also of interest are the epoxy group containing polymeric products derived from condensation of a phenol and formaldehyde to form a novolak resin having a plurality of phenylol groups and further condensing these products with epichlorohydrin.

Other polyepoxides of interest include the interpolymers formed from epoxy-containing monomers possessing at least one polymerizable ethylenic linkage. Addition polymers useful include poly(allyl 2,3 - epoxy-propyl ether), poly(2,3-epoxy propyl crotonate), allyl glycidyl ether-vinyl acetate interpolymers and others obtained by interpolymerization of glycidyl acrylates with one or more acrylic monomers, illustratively, ethyl acrylate, methyl methacrylate, 2-ethyl hexyl acrylate, ethyl methacrylate, etc. Reference is made to copolymers as described in U.S. 2,687,405 as further illustrative.

Still other polyepoxides include the reaction products of polyhydric alcohols with, for example, bis(2,3-epoxy propyl) ether and homologous epoxy compounds.

The aforementioned illustrative polyepoxides are characterized by having in excess of one epoxy group in the molecule, and in the greatest number of cases and preferably but not essentially, the polyepoxides are of polymeric nature. That is, the molecule of polyepoxide will have unit groups within the molecule which repeat themselves and the total polymeric molecule will contain in excess of one oxirane group.

The prior art accounts quantitatively in a number of ways as to the amount of reactive epoxy group or oxirane group in the polyepoxide. The amount is sometimes referred to by weight percentage of epoxy groups in the polyepoxide molecule. Epoxy equivalency as used in the art is defined as the mean number of epoxide groups in the average complete molecule of the polyepoxide component.

Epoxy equivalency of the polyepoxides useful for the purposes of this invention are of an order greater than one, but most often are not materially in excess of two. The art also refers to the equivalents of epoxide in 100 grams of polyepoxide product. This terminology is less popular but is equally useful and related to epoxy equivalency. Thus, illustratively, a polyepoxide product may have a numerical epoxy evaluation in terms of equivalents of epoxide per 100 grams of polyepoxide product of 0.50 and a molecular weight of 350. Epoxy equivalency would be expressed as the quotient of the m. wt. of the polyepoxide divided by the number of grams of polyepoxide containing one epoxide equivalent. The number representing the number of grams of polyepoxide containing one epoxide equivalent (herein referred to as the epoxide equivalent value) would be 100 divided by 0.50 or 200. Thus 200 grams of polyepoxide would contain one equivalent weight in grams of epoxy group. Now, dividing the molecular weight of the exemplary material (350) by the grams of material containing one equivalent of epoxy (200) the epoxy equivalency would be 350/200 or 1.75. From the mixed number resulting one can see that illustrative structures often postulated showing a terminal epoxy group at both ends of the idealized structure of a polyepoxide composition, while usefully illustrative, are not an exact portrayal of the true structure. For purposes of definition of the polyepoxide component of the present coating composition, the term expoide equivalent value is used and refers to the grams of polyepoxide component containing one gram equivalent of epoxide and the representative numerical values are of the order of 100 to 1000 and preferably of the order of 150 to less than 500 for optimum results in the coating compositions of this invention.

THE QUATERNARY IMIDAZOLINIUM SALT CATALYST

The catalytic component essential to the coating compositions of this invention comprise certain quarternary imidazoline salts. The imidazolines, or glyoxalidines, are conventionally regarded as dehydration products of amides, and as a general class are prepared by the reaction between a polyamine and an aliphatic carboxylic (fatty) acid. The free base obtained may be further reacted to form the quarternary salts.

The quarternary imidazolines useful for the purposes of this invention are of a class of substituted imidazoline salts of the following general structure:

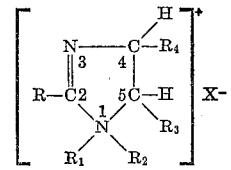

where R is a non-halogen substituted aliphatic hydrocarbon chain from one to about thirty-six carbon atoms in which the chain length limitation is not particularly critical, so far as known. When R is within the range of from 7 to about 18 carbon atoms, excellent performance can be had. $R_1$ is selected from the group consisting of hydrogen, lower aliphatic and aromatic hydrocarbon radicals containing not more than about six carbon atoms in a first hydrocarbon structure (which is non-halogenated), aliphatic compounds containing not more than six carbon atoms in a first chain terminating in radicals selected from the group consisting of hydroxyl and amino groups and the fatty acid salts, esters and amides of said groups where the fatty acid contains the same number of carbon atoms as R minus one in a non-halogen substituted hydrocarbon structure, $R_2$ is selected from the group consisting of hydrogen and alkaryl hydrocarbon radicals containing a single non-halogenated aromatic ring. In a preferred form of the invention $R_1$ and $R_2$ are not both hydrogen and are not the same group, but rather, $R_1$ is a fatty acid amide of an ethyl amine residue and $R_2$ is a methyl benzene residue. $R_3$ and $R_4$ are primarily hydrogen atoms.

X is an anion, usually a halogen, most often chlorine but other ions useful include sulfates, nitrates, bicarbonates, salicylates, formates, propionates, etc., the anion usually being related to the method selected for formation of the quaternary imidazolinium salt.

One illustrative example of the many useful species of quaternary imidazolinium salts for the purposes of this invention is formed by reacting stearic acid and ethylene diamine through a series of dehydration steps to form the free imidazoline base. The imidazoline base may be further condensed with an alkylating agent e.g., alkyl halide, alkaryl halide, dialkyl sulfate (diethyl sulfate, etc.) allyl acetate, etc. to form as exemplary and in the appropriate case such quaternaries as 1-(2 stearamidoethyl)-2n heptadecyl (1 or 3) benzyl-2-imidazolinium chloride, 1-(2 stearaminoethyl)2n heptadecyl (1 or 3) diethyl-2-imidazolinium sulfate, etc. In another illustratively useful species of the catalyst hydrogenated fish oil fatty acids are similarly condensed with a polyamine to form 1-(2-n-docosoamidoethyl) 2-n heneicosane-(1 or 3) benzyl-2-imidazolinium chloride. Other long chain fatty acids in the aliphatic series have been similarly reacted with polyamines to produce other modifications of substantially equivalent value as catalytic agents in the baking compositions of this invention.

For example, compounds of the structure:

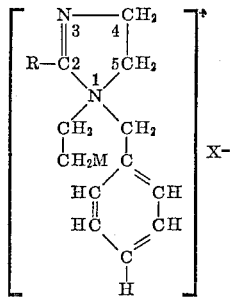

where R has been varied from one to about 36 carbon atom hydrocarbon chain have been found useful. In this series, M may be a hydroxy group or an amine group. Long chain fatty acid esters, salts and amides of the M group do not interfere with the functional quality of the imidazoline for the purposes of this invention, and the amides described are of particular merit.

While the substituents are pictured as conjoined with the number 1 nitrogen atom, no tests have yet established whether the substituents are on number 1 or number 3 nitrogen of the imidazoline ring.

While R may be saturated or unsaturated, present evidence (secured as a result of age stability tests) in compositions as herein disclosed, indicates longer stability of the completed coating where R contains more than 16 carbon atoms in the hydrocarbon chain and is saturated rather than unsaturated.

Among the specific quaternary imidazoline salts useful, the following are readily available in commercial quantities and are of immediate commercial value for the purposes and practice of this invention: 1-(2-stearamidoethyl) - 2 - heptadecyl-(1 or 3) benzyl-imidazolinium chloride; 1-(2-hydroxyethyl) 2-heptadecenyl (1 and 3) benzyl-2-imidazolinium chloride; admixtures of the latter with the 2-heptadecadienyl homologue. Initial tests of the foregoing imidazolinium quaternary catalysts were run at about ten parts of catalyst per weight part epoxy equivalent in the coating composition polymeric solids. In another preliminary series of tests using a range of from 4 parts to about 30 parts of mono-imidazolinium quaternary per weight part epoxy equivalent of plymeric solids, this numerical range was found to define the greatest useful value for the purposes of interest to the present compositions. It was observed that when R was of the lower order of chain length; for example, 1-(2 acetoamidoethyl)-2-n methyl-benzyl-2 imidazolinium chloride, initial tendencies to instability were more pronounced; as the R chain length was increased, less initial change was observed in test formulas. At the terminal test period of about 30 days, less diffeernces between the short and 1 long chain R group compounds could be detected.

It was also observed, however, that one can also obtain faster cures (less time of bake) at a given temperature level, or an equivalent cure with the same time at a lower minal test period of about 30 days, less differenecs between the short and long chain R group compounds could be detected.

During initial investigations of the quaternary monoimidazolinium salts in the present compositions of this invention, erratic results first observed were traced to lack of purity of the quaternary mono-imidazolinium salt catalysts under test. Later, more carefully purified quaternaries of the class under discussion were found to be more reliable and to insure increased storage life of the compositions of the invention. With pure imidazolinium catalysts, as low as 0.18 part catalyst per part epoxy equivalent in the polymeric solids blend provided effective cross-linking of the polymer films upon baking. As might be anticipated, the more pure the catalysts, the better the result of its use.

In an attempt to indicate the operable catalyst percentage range it was early found that the amount of catalyst useful depended in the greater measure on the baking schedule desired for the final step in the finishing operation but also in part upon the length of storage life essential to the production and use schedule of the coating composition. In a particular trial, for example, 2% (by weight of the total solids) of a quaternary imidazolinium chloride catalyst in an epoxy polymer-vinyl-carboxyl polymer blend, baked out (cross-linked to form a hard film) in a 20 minute schedule at 350° F.; 4%, or double the amount of catalyst was found to give a similar hardness of film in a 30 minute schedule at 300° F. Equivalent hardness in a 60 minute schedule at 250° F. bake required 6% of catalyst in the test formulation. As it was observed that the higher the catalyst concentration, the shorter the useful storage life, it then became desirable to control and use the lowest catalyst level commensurate with the hardness required in the baked film under the particular baking schedule.

Thus, the useful amount of catalyst will vary considerably, depending upon ultimate requirements, but will fall within the range of from about 0.1 part to about 26 parts catalyst per part epoxy equivalent in the polymer solids constituting the major proportion of the binder of the completed coating composition. The range of baking schedules used effectively have ranged from 90 seconds at 550° F. down to 60 minutes at 200° F., a range exemplary but not kown to be critical.

QUANTITATIVE RELATIONSHIPS

The three essential components of the thermosettable fluid coating of interest here comprising a polyepoxide, an acrylic interpolymer containing in excess of 4% but not more than 25% of an acrylic acid monomer in the interpolymer and the quaternary imidazolinium salt are intermixed in such proportions that the polyepoxide component will constitute from in excess of 7% but less than 90% and preferably not in excess of 75% of the total solids of the coating composition.

Correlatively, the acidic acrylic interpolymer will account for the remainder of the solids with the exception of the quaternary monoimidazolinium salt. The catalyst salt is present in relatively small quantity but non-the-less essential to cross-linking or thermosetting of the acrylic interpolymer-epoxy blend. Cross-linking is believed to occur through the oxirane group of the polyepoxide and the carboxyl group of the acrylic interpolymer under heat and catalyst.

A further limitation on the apparently broad range of percentage of the film-forming solids components lies in the additional proviso that the ratio of the vehicle solids of each of the components, the polyepoxide and the acidic acrylc interpolymer shall always be such that there will be at least a stoichiometric equivalency of epoxy groups of the polyepoxide to the carboxyl groups of the acidic acrylic interpolymer. Stoichiometric equivalents gives excellent films. Outside stoichiometric equivalents an excess of epoxy groups over carboxyl groups is to be preferred. Further, on a film-forming solids basis, it is essential that there be at least in excess of 4% based on the acidic acrylic interpolymer of acidic acrylic monomer in the interpolymer. This lower limit of available carboxyl groups has been found essential to provide at least a minimum cross-linking during baking of the film to produce a thermosetting (hard, not thermoplastic) final coating subsequent to the bake.

In a series of exploratory trials relating to quantitative relationship of the essential components of the coatings of this invention, a polyepoxide having an epoxide equivalent of 460 was blended with an acidic acrylic interpolymer containing between 10 and 11% of an acrylic carboxylic acid monomer in the interpolymer. A level of 0.2 gram of 1-(2-stearamidoethyl)-2 heptadecyl (1 or 3) benzyl-2-imidazolinium chloride solids per epoxide equivalent was maintained. Where a stoichiometric deficiency of epoxy groups in the polyepoxide over acid groups in the acidic acrylic interpolymer were blended and the resultant coatings were artificially aged at a temperature of the order of 125° F. (a temperature standardly used in the paint industry for this purpose), stability is lessened. One day at this temperature is often equated to one month under normal conditions of storage. Stabilities (time in the fluid state) were of the order of 75% less (in time) than where the quantity of epoxy groups were equivalent to, or in stoichiometric excess of the acid groups present in the test blends. In blends where the epoxy equivalents were of the order of 50% in excess over the acid groups age stability increases over deficiencies were of the order of 1000% improved in time.

From forced age of representative blends of components and catalysts as indicated, it became apparent that the relationship of epoxy groups in the polyepoxide to the carboxyl groups in the acidic acrylic interpolymer should for maximum life of the intermixed composition be at least equivalent, and where otherwise desirable the epoxy groups should be in stoichiometric excess in relation to carboxyl groups.

The imidazolinium catalyst is preferably related to the epoxy group content in a given combination of components. When the catalysts are carefully purified as low as 0.18 part by weight per weight part equivalent of epoxy group is sufficient to stimulate and impart cross-linking. The amount of catalyst to epoxy group in the combination will depend in great measure on the baking schedule, as discussed more fully elsewhere. However, a good practical range of usefulness of from 5 parts to about 20 parts catalyst per weight part epoxy equivalent may serve as a guide in most all cases, more being permitted and less, effective but not optimally so.

Baking schedules of the final coating composition when applied in thin films to appropriate substrates can be varied over a time-temperature schedule of relatively wide range. For example, a baking schedule of 90 seconds at 550° F. to 60 minutes at 200° F. have been used with more or less successful cross-linking and thermosetting of the coatings of this invention. 350° F. and 15 minutes time illustrate a median energy input.

While no one composition as herein illustratively set out gave all the exceptional performances as listed below, compositions within the scope of this disclosure gave performances as recorded below:

(1) Resistance to 600 hours salt spray
(2) Resistance to 1000 hours 100% R.H.
(3) Resistance to 1000 hours grease at 25° C.
(4) Resistance to 650 hours "Tide"—1% at 165° F.
(5) Resistance to 1000 hours "Weather-O-Meter"
(6) Resistance to 60% elongation G.E. Flex.
(7) Resistance to 30 inch pounds of Gardner reverse impact
(8) Resistance to double reverse bend ⅛″ mandrel on aluminum
(9) Sward hardness of 52 based on glass at 100

Thus, changes in proportions of the component elements (excluding the catalyst) will provide means of meeting many requirements of industrial finishes. In combination with the catalyst, the completed coating compositions become practicable to meet the storage-stability requirements of the trade, a desideratum not heretofore met by the prior art compositions most closely related hereto.

The following exemplary portion of the specification illustrates the practice of the invention. Many other permutations and combinations of the essential components as herein described and within the purview of the disclosure and claims will be apparent to the skilled formulator of baking coating compositions. The examples are intended as illustrative, except where otherwise specifically indicated.

The initial examples contain typical formulations of ethylenically unsaturated interpolymer containing functional carboxyl groups and/or oxirane groups, within the scope of usefulness for the ends of this invention.

*Example 1.—Polymer A*

1050 parts ethyl acrylate, 450 parts methyl methacrylate, 120 parts glacial methacrylic and 5½ parts benzoyl peroxide are mixed together. One quarter of the total mixture is bled into 1500 parts of high flash naphtha in a reaction vessel equipped with stirrer, heat exchanger, reflux condenser thermometer, etc., at a temperature of approximately 290° F. When the temperature begins to rise, indicating monomers have substantially reacted, the remainder of the monomer blend is added at a rate sufficient to continue reflux over a period of approximately 2 hours. The interpolymer is maintained at between 295 and 300° F. and one to 2 parts ditertiary butyl peroxide is added. If after an additional hour at this temperature the non-volatile content is not up to standard, the peroxide and heating steps are repeated.

Polymer A:
  Percent non-volatile=51.5%
  Viscosity=U (Gardner Holdt tube)

*Example 2.—Polymer B*

Polymer B is a class of standardly available commercial product resulting from the reaction of a polyhydric phenol with a polyfunctional halohydrin. Polyepoxide ether resins have within the condensate epoxide groups glycidyl groups, or oxirane rings. Such products are part of the prior art. Methods of manufacture are disclosed in a large number of U.S. and foreign patents.

Polyepoxides useful for the purposes herein are limited to those having an epoxy equivalent above about 100 and not above about 1000; preferably from about 140 to less than 500 in epoxide equivalent value. As is known in the art, the epoxide equivalent value is the number of grams of polymeric compound essential to contain one gram equivalent of epoxide. Hence, polyepoxides having a high epoxide equivalent value are less reactive under general considerations than those containing lower epoxide equivalent values.

Illustrative species of ether resins under Polymer B classification are readily available commercial resins. Species are further identified for purposes of illustrating this invention as follows:

TABLE

| Polymer [a] | Durran, M. P. | Viscosity Gardner Holdt Poises | Epoxide Equivalent |
|---|---|---|---|
| B1 | Liquid | G-F, 0.9-1.5 | 140-165 |
| B2 | do | S-V, 5-9 | 175-210 |
| B3 | do | $Z_3$-$Z_5$, 40-100 | 175-210 |
| B4 | do | $Z_5$-$Z_6$, 100-160 | 175-210 |
| B5 | do | O-V, 3.5-9 | 225-290 |
| B6 | 40-45 | $A_1$-$B_1$, 0.3-06 | 300-375 |
| B7 | 65-75 | D-G 1.0-1.6 | 425-550 |
| B8 | 95-105 | Q-U 4.3-6.2 | 875-1,025 |
| B9 | 125-135 | Y-$Z_1$ 17.-27 | 1,900-2,450 |

[a] The species of ether resins from B1 through B4 are 100% solids resins; all others are in solution in butyl carbitol at 40% solids content. Epoxide equivalent values in the table are based upon the non-volatile solids.

Example 3.—Polymer C 954 parts ethyl acrylate, 636 parts methyl methacrylate, 426 parts glycidyl methacrylate and 6¾ parts benzoyl peroxide are mixed and 50% by weight of the mixture is mixed with 2,016 parts high flash naphtha in a reflux reactor similar to that used in the manufacture of polymer A. After reflux temperature starts to rise from about 250° F., the remaining mixture of blended monomer is added at a rate such as to maintain moderate reflux over about 1½ hours. Subsequently, the temperature is allowed to rise from 304° to about 322° F. over a 12 hour interval. 5 parts of ditertiary butyl peroxide is added at 4 hour intervals. The non-volatile content of the reaction mass is 50%±.5% at the end of the reaction. Polymer C has an epoxy equivalent value of 460. It is illustrative of another class of polyepoxides within the scope of this invention.

Example 4.—Polymer D 1080 parts ethyl acrylate, 720 parts methyl methacrylate, 216 parts glacial methacrylic acid and 6¾ parts benzoyl peroxide are blended together and one-third of the total blend is incorporated in 2016 parts high flash naphtha. Temperature of the blend is increased to 280° F., a point of initial reflux, in a manner similar to that described in polymers A and C. The remaining two-thirds of the blend of monomers are added at a rate such as to maintain gentle reflux and after reflux substantially ceases, 15 parts total of ditertiary butyl peroxide are incrementally added to the polymeric solution while holding the temperature between 270° and 300° F. until the solids content reaches 50%±0.5%. 1000 parts n-butyl alcohol are used to further reduce the solids content to about 43%.

Example 5.—Polymer E 1440 parts methyl methacrylate, 360 parts ethyl acrylate, 216 parts glacial methacrylic acid and 6¾ parts benzoyl peroxide were interpolymerized as described in example illustrating preparation of polymer D in 2016 parts high flash naphtha. 1000 parts n-butyl alcohol were added subsequent to polymerization completion as described in the previous example.

Example 6.—Polymer F 1080 parts styrene, 360 parts ethyl acrylate, 60 parts methacrylic acid (glacial) and 30 parts benzoyl peroxide are blended together and ¼ of the total is combined in a reflux reaction vessel and heated to about 290° F. in 1500 parts xylene. After the monomers have interpolymerized as indicated by increasing reflux temperature, the remainder of the monomer blend is added at such rate as to maintain gentle reflux. The interpolymerization is completed substantially as in the previous examples. Polymer F has an acid value of 28.20 (on the non-volatile solids), a non-volatile solids content of 49.8% and a V viscosity (Gardner-Holdt tube).

Example 7

Polymers C, D and E were blended together to produce the following series of products having indicated stoichiometric relationships.

| Product Ident. | Poly C Solids, Percent | Poly D or E Solids | Epoxy Equivalence |
|---|---|---|---|
| 7a | 30 | 70% D | 50% excess. |
| 7b | 56 | 44% D | Equivalent. |
| 7c | 84 | 16% D | 50% deficit. |
| 7d | 30 | 70% E | 50% excess. |
| 7e | 56 | 44% E | Equivalent. |
| 7f | 84 | 16% E | 50% deficit. |

After reduction to spraying viscosity with a blend of high flash naphtha and amyl alcohol at about a 20/80 ratio, aliquot portions were treated with catalyst gel mixtures prepared as follows:

Catalyst 7y—33.3 parts 1-(2 stearamido ethyl)-2 heptadecyl benzyl 2 imidazolinium chloride in 66.7 parts high flash naphtha The amount of catalyst added was determined by trial and test to be only 0.186 part active material per epoxide equivalent value in parts of the epoxy containing polyepoxide resin. This amount was found to be about one one hundredth less than when using polymer B of Example 2 as epoxy source. Stability of these blends were compared with the nearest prior art quaternary catalyst, namely; benzyl tri-methyl ammonium chloride (Example 7e') at the same level of concentration by heating catalyst containing samples to 125° F.

Coating compositions in the series identified from 7a through 7f of Example 7 were treated with catalyst 7y. To identify the blended catalyst heated coatings the series of tests and coatings labeled 7ay through 7fy, and 7e' correspond to tests of such blends.

TABLE I

| Sample Id: | Stability—Weeks to gel at 125° F. |
|---|---|
| 7ay | More than 10. |
| 7by | More than 4. |
| 7cy | More than 5. |
| 7dy | More than 10. |
| 7ey | More than 5. |
| 7fy | More than 5. |
| 7e' | Less than 1. |

Example 8

An enamel base was prepared by mixing together 1106 parts rutile titanium dioxide and 620 parts of polymer F of Example 6. The mixture was ground to a 7 Hegman grind on a 3 roll mill.

This base was then used to prepare a series of enamels utilizing the polymer B series of epoxy resins. The enamels were prepared and catalyzed with catalyst gel 7y as described in Example 7. The variations are tabulated as follows:

TABLE II

| Ident. | Epoxy | Percent Epoxy | Percent Solids of Polymer F | Parts Solid Catalyst [a] |
|---|---|---|---|---|
| 8a | B1 | 6 | 94 | 0.18 |
| 8b | B2 | 8 | 92 | 0.19 |
| 8c | B4 | 9 | 91 | 0.20 |
| 8e | B5 | 11 | 89 | 0.19 |
| 8f | B6 | 17 | 83 | 0.23 |
| 8g | B7 | 21 | 79 | 0.20 |
| 8h | B8 | 42 | 58 | 0.20 |
| 8i | B9 | 70 | 30 | 0.15 |
| 8j [b] | B4 | 9 | 91 | 0.20 |

[a] The catalyst content is equivalent to 18.6 parts solid catalyst (7y) per epoxy equivalent in the enamel binder solids in each case.
[b] Benzyl trimethyl ammonium chloride.

The above paints were reduced with a solvent blend, applied to test panels of aluminum and baked out, 30 minutes at 350° F. The results are as tabulated below:

bly was heated ten minutes at 300° F. and after disassembly, the surface of the enamel was examined for printing.

TABLE III

| Panel Coated With Enamels Identified In Table II Above | 60° Gloss, Gardner | Pencil Hardness, Gardner | 400 hr., 10% Tide Resist. | Direct Impact,[a] Gardner | Grease Resistance [b] (Pencil) | |
|---|---|---|---|---|---|---|
| | | | | | Initial | 1250 hrs. |
| 8a | 92 | H | 3 | Bad | H | F |
| b | 91 | H | 5 | do | H | H |
| c | 98 | H | 8 | Very good | H | H |
| d | 90 | H | 7 | Fair | H | H |
| e | 90 | H | 3 | Poor to Bad | H | H |
| f | 90 | H | 5 | Fair to good | H | H |
| g | 62 | 2H | 7 | Fair | 2H | H |
| h | 39 | 2H | 5 | Very good | 2H | 2H |
| i | 52 | 3H | 3 | do | 3H | 3H |
| Control 8j | 98 | H | 8 | do | H | H |

[a] 28" direct Gardner Impact Test.
[b] Grease is 1/1 ratio lard oil to oleic acid—measured in terms of softening—by pencil hardness grades.

The data appearing in the above table and in the several other tables herein result from tests ordinarily employed in the coatings art. The official text relied on is H. A. Gardner and G. G. Sward, "Physical and Chemical Examination of Paints, Varnishes, Lacquers and Colors," XII, March 1962.

The tests as reported in Table III indicate the polyepoxide epoxy resin should preferably be characterized by an epoxide equivalent of about 200 for best enamel development but that the catalysts of the present invention are useful over the range of epoxide equivalents of the epoxy resin in combination as herein shown.

*Example 9*

An enamel mill base was prepared containing 100 parts rutile titanium dioxide and 30 parts polymer A. Subsequent to dispersion, 30 parts of the milled base were thinned with 62 parts polymer A, 5 parts polymer B and 3 parts amyl alcohol. In the above enamel the acid equivalents of polymer A are stoichiometrically equivalent to the epoxy equivalents of polymer B. One aliquot portion of the above enamel, identified as the control (9 control) was intimately admixed with benzyl trimethyl ammonium chloride[2] at a 30 parts per enamel epoxy equivalents level in an aqueous carrier (40% water). A gel containing 33⅓% of 1-(2-stearamidoethyl)-2-heptadecyl-1[3] benzyl-2-imidazolinium chloride in high flash naphtha was used to catalyze four other aliquot portions of the test enamel described in accordance with the following schedule:

TABLE IV

| Sample Aliquot | Catalyst | Catalyst level per epoxy equivalent |
|---|---|---|
| 9 control | BTAC [2] | 30 |
| 9a | Imidazolinium chloride [3] | 26.1 |
| 9b | do | 18.6 |
| 9c | do | 10.9 |
| 9d | do | 3.25 |

The test enamels were spray applied to aluminum panels, separate panels being baked at four different temperatures for four different times. A thermoprint test was used to evaluate the cure of the film. A weight of 1,150 grams per square inch, imposed on 4 layers of cheesecloth was brought to bear on the finish. The assembly Evaluation was made of the test panels in accordance with the following ratings:

10—No print—completely thermoset.
9—Very slight print visible.
8—less than ⅛ sq. in. printed (cloth falls free).
7—less than ¼ sq. in. printed (cloth falls free).
6—less than ½ sq. in. printed (cloth falls free).
5—or less to 0 (cheese cloth adheres to panel.) Not cured.

TABLE V

| Panel Ident. | 200°F. | | | | 250°F. | | | | 300°F. | | | | 350°F. | | | |
|---|---|---|---|---|---|---|---|---|---|---|---|---|---|---|---|---|
| | 15 | 30 | 45 | 60 | 15 | 30 | 45 | 60 | 15 | 30 | 45 | 60 | 15 | 30 | 45 | 60 |
| 9d | 1 | 1 | 1 | 1 | 1 | 2 | 5 | 7 | 5 | 7 | 7 | 7 | --- | --- | --- | --- |
| 9c | 0 | 3 | 7 | 5 | 7 | 8 | 8 | 8 | 8 | 8 | 8 | 7 | 8 | 8 | 8 | 8 |
| 9b | 4 | 7 | 7 | 8 | 7 | 8 | 8 | 8 | 8 | 8 | 8 | 8 | 8 | 9 | 9 | 9 |
| 9a | 5 | 5 | 5 | 7 | 7 | 7 | 7 | 7 | 7 | 7 | 7 | 7 | 7 | 8 | 8 | 8 |
| 9 control | --- | --- | --- | --- | --- | --- | --- | --- | --- | --- | --- | 7 | --- | --- | --- | --- |

The above tests establish cross-linking and good cure with the imidazoline catalyst of this invention at 3.25 parts catalyst per epoxy equivalent when baked at 250° F. for 60 minutes, at 10.90 parts catalyst at a minimum of 200° F. for 45 minutes; at 18.60 parts, 200° F. for 30 minutes. Above this level, additional catalyst content per epoxy equivalent is not useful to lower the time-temperature cycle to obtain good cure. The data indicates optimum cure at a catalyst level between 10 and 20 parts of imidazolinium halide catalyst per part by weight epoxy equivalent in the epoxide-carboxyl containing polymer blend.

Note the catalyst of this invention at 300° for 30 minutes is effective to the same degree as the prior art control in effecting cross-linking at approximately ⅒ the amount of catalyst per part by weight epoxy equivalent in the blend.

Samples of the above vehicles were baked out 30 minutes at 350° on comparative test panels.

TABLE VI

| Ident. | Sward Hard. | Flexibility, Percent (G. E. Meter) |
|---|---|---|
| 7ay | 24 | 2 |
| 7by | 21 | 2 |
| 7cy | 12 | ½ |
| 7dy | 21 | 0 |
| 7ey | 22 | 1 |
| 7fy | 15 | 0 |
| 7e' | 21 | 1 |

The numerals in column 2 of Table VI are Sward hardness numbers resulting from tests described in the aforementioned text by Gardner and Sward.

The chemical and stain resistance of the test panels was rated—visual with 10 rating top—no failures with 0 as complete failure with the results as tabulated below (¼ gram-under glass-24 hours).

TABLE VII

| Ident. | Conc., 1% H₂SO₄ | 5%–1% NaOH | 1-5-25% CH₃COOH | 2% HNO₃ | $\overset{O}{\underset{\|}{CN_3C}}-CH_3$ |
|---|---|---|---|---|---|
| 7ay | 0–10 | 6–0 | 10–8–2 | 2 | 0 |
| 7by | 0–10 | 10–10 | 10–6–2 | 2 | 0 |
| 7cy | 0–4 | 6–6 | 10–6–6 | 6 | 4 |
| 7dy | 0–10 | 0–0 | 10–8–4 | 8 | 6 |
| 7ey | 0–10 | 10–10 | 10–8–2 | 8 | 4 |
| 7fy | 0–4 | 8–4 | 8–6–4 | 8 | 6 |
| 7e' | 0–9 | 10–10 | 10–8–2 | 8 | 4 |

*Example 10*

An enamel was prepared as described in Example 9, without the addition of catalyst. A series of organic compounds containing nitrogen as suggested in the prior art, along with a representative group of imidazolines within the scope of this disclosure were incorporated into a carrier consisting of 60% toluene-40% n-butanol and incorporated into aliquot portions of the test enamel at about 26 parts of catalyst per epoxy part equivalents. The samples were stored at 125° F. until gelation occurred and the days to gelation recorded. The results are tabulated below.

TABLE VIII

| Example | Catalyst | Days to Gelation |
|---|---|---|
| 10a | Dimethylethanolamine | 4 |
| 10b | β-Hydroxy trimethyl ammonium carbonate | 4 |
| 10c | Benzyl trimethyl ammonium chloride | 4 |
| 10d | 1-(2-hydroxyethyl)-2-COCO-(1 or 3) benzyl-2-imidazolinium chloride | 8 |
| 10e | 1-(2 hydroxyethyl)-2 heptadecenyl-(1 or 3)-benzyl-2-imidazolinium chloride | 11 |
| 10f | 1-(2 hydroxyethyl)-2-oleic-(1 or 3) benzyl-2-imidazolinium chloride | 13 |
| 10g | 1-(2-stearamidoethyl)-2-heptadecyl-(1 or 3) benzyl-2-imidazolinium chloride | 31 |
| 10h | 1-(2-capryl amidoethyl)2-heptadecyl-(1 or 3) benzyl 2-imidazolinium chloride | 32+ |
| 10i | 1-(2-n-docosan amidoethyl) 2-n-heneicosane-(1 or 3) benzyl imidazolinium chloride | 32+ |
| 10j | Catalyst of 10g—carefully purified by re-crystallization | 32+ |
| 10k | 1-(2-stearamidoethyl)-2-n-heptadeceniel-(1 or 3) benzyl-2-imidazolinium chloride | 15+ |
| 10l ᵃ | 1-(2-hydroxyethyl)-2-COCO-(1 or 3) (4-chlorobutyl)-2-imidazolinium chloride | 4 |

ᵃ Note the chlorine substituent gave detrimental result.

That the invention also may include other acidic unsaturated interpolymers has been indicated in the exploratory tests exemplified by the following illustrations. An oil modified alkyd resin was prepared by alcoholysis of 110 parts of oiticica oil and 130 parts linseed oil with 56 parts glycerine with 0.25 part litharge catalyst at 440° F. When phthalic anhydride compatability had been reached, 203 parts phthalic anhydride and 52 parts additional glycerine were added. The batch was blown with inert gas and held to a cure of 13–18 seconds and an acid value of from 25–30. The resin was thinned to 60% solids with xylene.

A blend of the oil modified alkyd and polymer B2 was made containing 90% of the oil modified alkyd and 10% of polymer B2 epoxy resin. To aliquot portions of each of two samples were added catalysts for comparison using 5 grams of catalyst per gram epoxy equivalent. Sample 11–a contained 1-(2-stearamidoethyl) 2-n-heptadecyl-benzyl-2-imidazolinium chloride. Sample 11–b contained benzyl trimethyl ammonium chloride. Both samples baked out in 30 minutes at 350° F. on metal panels to produce thermoset films of good quality as to flexibility, mar proofness and toughness.

TABLE IX.—AGE STABILITY COMPARISON

| Days at 125° F | 0 | 4 | 11 | 18 | 25 | 32 |
|---|---|---|---|---|---|---|
| Sample 11–a | ᵃ 19 | 21 | 25 | 32 | 34 | 44 |
| Sample 11–b | ᵃ 27 | 46 | 125 | gelled | gelled | gelled |

ᵃ Viscosity in seconds—#2 S-W Cup.

Polyester, similar to the above alkyds, but without oil modification, are under tests.

The present invention has been illustrated generically by example through illustration of commercially promising species of the invention as well as the best method of practicing the invention known presently to the inventor. It is obvious that others skilled in the physical and chemical arts will be stimulated by the above disclosure to employ through the routineer and adapt other than the illustrated species to practical equivalent end use. Species other than those specifically illustrated may act singly or in combination in substantially the same way to produce substantially the same results as herein disclosed. It is the express intent to include herein substantial equivalents for the means disclosed as suggested to the mind operating from principle and skilled in the art to which this invention is directed. Such embodiments as are substantially equivalent in greater or lesser degree to the species herein illustrated, enumerated and claimed are not to be excluded. It is further the express purpose and intent of this invention to limit the scope of the appended claims to exclude the prior art but to include as a basis of interpretation the doctrine of equivalents.

Having thus described the improvement in production of thermosetting coatings activated by catalysts at elevated temperature and stable at room temperaure.

What I claim is:

1. A thermosettable fluid coating composition comprising in combination from 7% to not more than about 90% by weight of the total film-forming composition of a polyepoxide having an epoxy equivalent value ranging from 100 to less than 1000 and substantially the remainder of the composition is an acrylic interpolymer of two monomers minimally, at least in excess of 4% but not in excess of 25% of said polymer formed from an acid selected from the group consisting of acrylic acid, methacrylic acid, ethacrylic acid, phenylacrylic acid, crotonic acid, lower alkyl esters of such acids containing from 1 to 8 carbon atoms in the alkyl group, and another monomer interpolymerized therewith characterized by a single

group, and from 3 to 30 parts by weight for each weight part equivalent of said epoxide component of a 2 position aliphatic substituted halogen-free quaternary mono-imidazoline salt.

2. The method of thermosetting films of a liquid coating composition which comprises incorporating into a fluid coating composition from 7% to not more than about 90% by weight of the total composition of a polyepoxide having an epoxy equivalent value ranging from 100 to less than 1000 and substantially the remainder of the composition of an acrylic interpolymer of two monomers minimally, at least in excess of 4% but not in excess of 25% of said polymer formed from an acid selected from the group consisting of acrylic acid, methacrylic acid, ethacrylic acid, phenylacrylic acid, crotonic acid, lower alkyl esters of such acids containing from 1 to 8 carbon atoms in the alkyl group, and another monomer interpolymerized therewith characterized by a single

group; incorporating into said coating while in bulk a quantity of from 3 to 30 parts by weight for each weight part equivalent of said epoxide component of a 2 position aliphatic substituted quaternary monoimidazoline salt, depositing said treated liquid on a substrate in a film and heating said film at a temperature of from 200 to 550° F. for a time sufficient to transform said liquid film to a solid film.

References Cited in the file of this patent

UNITED STATES PATENTS

| | | |
|---|---|---|
| 2,604,457 | Segall et al. | July 22, 1952 |
| 2,878,234 | Peterson | Mar. 17, 1959 |
| 2,952,506 | Dellis | Sept. 13, 1960 |
| 2,954,358 | Hurwitz | Sept. 27, 1960 |